US007073066B1

(12) United States Patent
Nessett

(10) Patent No.: US 7,073,066 B1
(45) Date of Patent: Jul. 4, 2006

(54) OFFLOADING CRYPTOGRAPHIC PROCESSING FROM AN ACCESS POINT TO AN ACCESS POINT SERVER USING OTWAY-REES KEY DISTRIBUTION

(75) Inventor: Danny M. Nessett, Fremont, CA (US)

(73) Assignee: 3Com Corporation, Marlborough, MA (US)

(*) Notice: Subject to any disclaimer, the term of this patent is extended or adjusted under 35 U.S.C. 154(b) by 762 days.

(21) Appl. No.: 09/942,176

(22) Filed: Aug. 28, 2001

(51) Int. Cl.
*H04L 9/00* (2006.01)
(52) U.S. Cl. .................................... 713/181
(58) Field of Classification Search ................ 380/229, 380/277–279, 44, 45; 705/67; 713/181, 713/170
See application file for complete search history.

(56) References Cited

U.S. PATENT DOCUMENTS 6,253,326 B1 * 6/2001 Lincke et al. ............... 713/201

OTHER PUBLICATIONS (Menezes et al., pp. 503-504 Sections on Otway-Rees protocol, "Handbook of Applied Cryptography", 1997 CRC press.*

Schneier p. 175, "X9.17 key generation", Applied Cryptography, 2nd edition.*
Schneier, pp. 59-60, Applied Cryptography, 2nd edition.*

* cited by examiner

*Primary Examiner*—Emmanuel L. Moise
*Assistant Examiner*—Thomas Ho

(57) ABSTRACT

In a network access point, a method of processing encrypted communication. In one embodiment, the method comprises receiving from a wireless client a first message comprising first values for a first random number and information identifying the wireless client and the access point. In one embodiment, the method further comprises generating a second message comprising second values for a second random number and information identifying the access point and the wireless client. In one embodiment, the method further comprises sending the first values and the second values to an access point server, and subsequently the access point server generates a session key using the first and second values and third values provided by the access point server, such that the processes are shared by the access point and the access point server. The method further comprises distributing the session key to the wireless client and the access point.

25 Claims, 4 Drawing Sheets

OFFLOADING CRYPTOGRAPHIC PROCESSING FROM AN ACCESS POINT TO AN ACCESS POINT SERVER USING OTWAY-REES KEY DISTRIBUTION

FIELD OF THE INVENTION

The present invention relates to cryptographic processes in wireless communication in network environments. More particularly, the present invention relates to distributing cryptographic processes in network environments.

BACKGROUND OF THE INVENTION

Continued advancements in hardware technology and software development are enabling computer systems and other electronic devices, such as personal digital assistants, electronic books, cellular phones, etc., to be utilized in a variety of different implementations and applications. Some implementations are financial and commercial transactions, computer-aided design, health care, communication, data storage and warehousing, education, etc. Additionally, coupling these stand-alone computers and other electronic devices to form a networking environment greatly enhances their functionality. In a network environment, users are able to exchange information, share commonly stored files, combine resources, communicate via e-mail (electronic mail) and via video conferencing. Further, with the advent of wireless communication, networked computers can communicate and exchange information with nearly any other computer or other electronic device without having to be physically connected via a wired configuration.

In a wireless environment, there is a wireless client and an access point. The communication between the client and the access point is transmitted over public air space, so the communication is visible to anyone within range. In order to protect the privacy and contents of the transmitted communication, the information is commonly encrypted. To enable encryption, an encryption key is distributed to each of the clients utilizing the wireless network.

There are numerous different techniques for distributing encryption keys. One such technique involves public key cryptography, where the two parties sign (provide a digital signature for) a message using their respective private keys while authenticating (verifying the origin of) the message using the other party's public key. One type of public key distribution is the Diffe-Helmann scheme. The Diffe-Helmann scheme has an advantage in that the wireless client and the access point are the only parties that are apprised of the key. An Authenticated Diffe-Helmann scheme, an enhancement of Diffe-Helmann, provides that the two parties are aware of with whom they are communicating. Further, in Authenticated Diffe-Helmann, there may be a third party which checks the validity of the digital signatures, but that is the only function performed by the third party. Because the third party performs no computations, it is unaware of the session key used between the wireless client and the access point.

Public key cryptography, preferred from a strictly security standpoint, requires a substantial infrastructure, which is expensive to deploy and maintain. The necessary infrastructure can deter some customers from implementing this type of network security. More specifically, a significant drawback to Authenticated Diffe-Helmann is that it creates a significant computational burden on the access point. It is known that access points are commonly low end processing devices whose processing budget is highly constrained. In one attempt to alleviate the computational burden placed on the access point, some of the cryptographic processing associated with setting up a session key between a wireless client and an access point could be distributed to a system called an access server. However, if the computations performed by the access point are distributed to the access server, a number of properties of the original scheme are lost.

First, all three parties, the wireless client, the access point, and the access server, know the computed session key. Therefore, there is little justification for the increased computational burden imposed by Diffe-Helmann, which is a public key distribution scheme used to ensure only the two participating parties are apprised of the key.

Second, the session must be communicated from the access server to the access point using a cryptographically protected channel. Thus, there must be another shared key between the access point and the access server in addition to the signing key. It is well known that using the same key for both signing and encryption violates standard cryptography practices. Because the channel is protected using a symmetric encryption algorithm, the security of the Diffe-Helmann scheme is no more secure than the channel to which the algorithm is applied, which inherently reduces the security provided by Diffe-Helmann.

Another technique for distribution of encryption keys involves two parties holding a shared secret, where each party signs a message using the shared secret, while the other party authenticates the message utilizing the shared secret. This technique, termed shared secret based key distribution, is well known as being substantially less computationally intensive in comparison with public key cryptography.

Symmetric key cryptography is an encryption system in which the sender and receiver of a message share a single, common key that is used to encrypt and decrypt the message. Contrast this with public-key cryptography, which utilizes two keys—a public key to encrypt messages and a private key to decrypt them. Symmetric-key systems are simpler and faster, but their main drawback is that the two parties must somehow exchange the key in a secure way. Public-key encryption avoids this problem because the public key can be distributed in a non-secure way, and the private key is never transmitted. Symmetric-key cryptography is sometimes called secret-key cryptography. One of the more popular symmetric-key systems is the DES, short for Data Encryption Standard, developed in 1975 and standardized by ANSI in 1981. DES uses a 56-bit key, and a password or table is needed to decipher the encoded data. Another system is the RC4 encryption algorithm.

A well-known shared key based key distribution technique is the Otway-Rees scheme, which is known to dramatically reduce the computational burden on both the WC (wireless client) and the AP (access point).

Shared key based key distribution, inferior to public key cryptography, has its own drawbacks and shortcomings. This technique does not actually authenticate the sender of the message, it simply increases the likelihood that the incoming message originated from a sender that knows the shared secret. In addition, it is commonly known that this technique is subject to certain types of attacks, e.g., reflective attacks, that can complicate or disable the authentication process. Further, shared key based key distribution does not provide a way of uniquely identifying the communicating parties.

Thus, a need exists for a method and system to provide a secure wireless network for communication between a wireless client and an access point while reducing the computational burden placed on the access point and the wireless client. Another need exists for a method and system which meets the above listed needs and which provides positive identification of the parties communicating within a wireless network. Still another need exists for a method and system which meet the above listed needs and which provides an encryption key and a signing key.

SUMMARY OF THE INVENTION

Accordingly, the present invention provides a method and system to provide a secure wireless network for communication between a wireless client and an access point while reducing the computational burden placed upon the wireless client and the access point. Further provided by the present invention is a method and system which achieves the above listed accomplishment and which provides a third party which performs a majority of the computational processes. The present invention further provides a method and system which achieves the above listed accomplishments and which provides positive identification of the parties communicating within a wireless network. Additionally provided by the present invention is a method and system which achieves the above listed accomplishments and which further provides an encryption key and a signing key.

The present invention provides a method and system to provide a secure wireless network for communication between wireless clients and access points. In one embodiment, the present invention, utilized in a network access point, is comprised of a method of processing encrypted communication. In one embodiment, the method comprises receiving a first message from a wireless client. The first message comprises first values for a random number and information identifying the wireless client and the access point and a message authentication code of the information, in the first message, signed using a first signing key. In one embodiment, the method further comprises generating a second message comprising second values for a random number and information identifying the wireless client and the access point and a message authentication code of this information, in the second message, signed using a second signing key. In one embodiment, the method further comprises sending the first values and the second values to an access point server. In one embodiment, the access point server generates a session key using the first and second values and third values provided by the access point server, such that the processes are shared by the access point and the access point server. The method further comprises sending a third message conveying the session key to the wireless client and the access point. The message conveying the session key has a first portion and a second portion. In one embodiment, the access point verifies the second portion of the third message against the second values. In one embodiment, the method further comprises sending the first portion of the third message to the wireless client. The wireless client verifies the first portion of the third message against the first values, such that the session key is shared between the wireless client and the access point and the access server.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
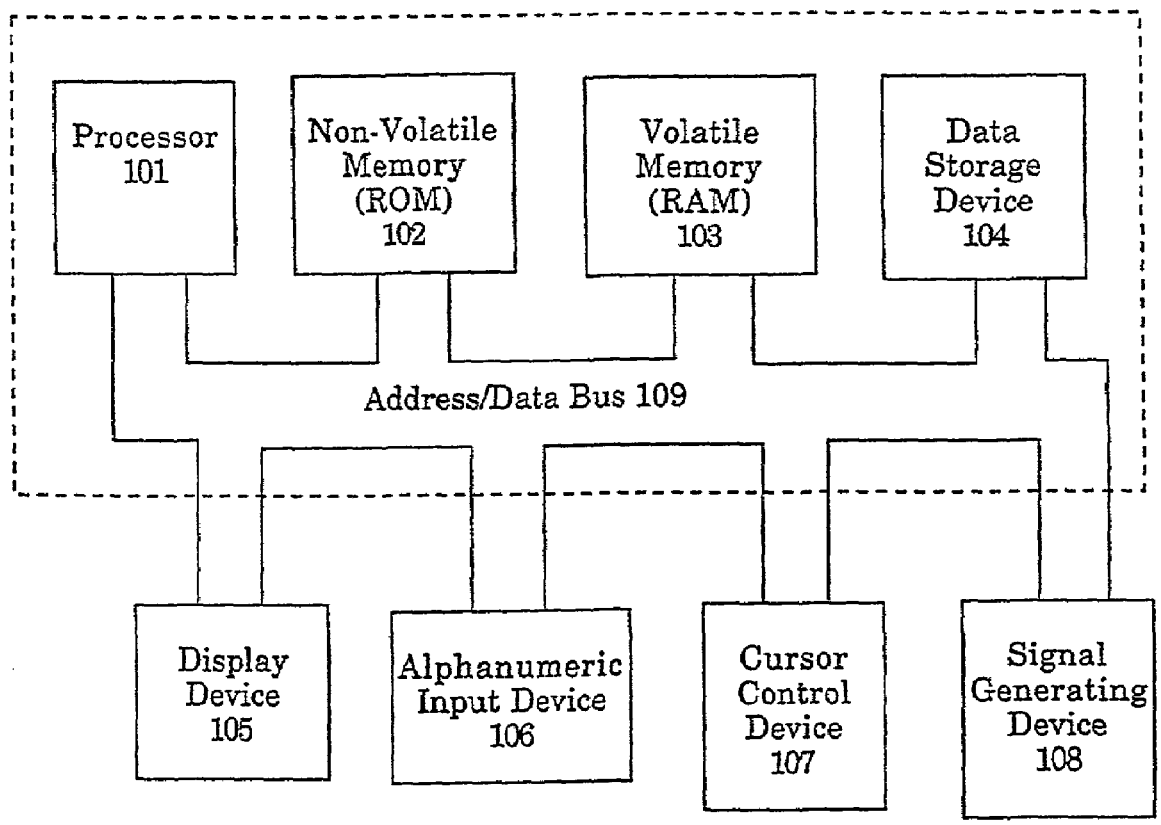
FIG. 1 illustrates an exemplary electronic system platform upon which embodiments of the present invention can be practiced.

Reference will be made in detail to the preferred embodiments of the present invention, examples of which are illustrated in the accompanying drawings. While the invention will be described in conjunction with the preferred embodiments, it is understood that they are not intended to limit the invention to these embodiments. Contrarily, the invention is intended to cover alternatives, modifications, and equivalents, which may be included within the spirit and breadth of the invention as defined by the appended claims. Additionally, in the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Additionally, in other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "receiving" or "verifying" or "encrypting" or "sending" or "transmitting" or "decrypting" or "enabling" or "computing" or "calculating" or "providing" or "conveying" or the like, refer to the action and processes of an electronic system or a computer system or similar electronic computing device such as a PDA (personal digital assistant), cell phone, pager, optical or mechanical computer, etc. The electronic device or similar computer system or other device manipulates and transforms data represented as physical (electronic) quantities within the computer system's registers and memories into other data similarly represented as physical quantities within the computer system memories or registers or other such information storage, transmission or display devices.

In a preferred application, embodiments of the present invention are implemented in conjunction with symmetric key cryptography. In one embodiment, the symmetric key cryptography is supported by an Otway-Rees cryptography key distribution protocol. It should be appreciated that embodiments of the present invention may be utilized with other symmetric cryptographic algorithms, including but not limited to DES or RC4.

It should be appreciated that additional notations are utilized in the detailed description to follow. The additional notations are as follows:

WC: The wireless client. Also used to represent the identifier of the wireless client.

WC-Type: A value that identifies a participant in the protocol as being a wireless client.

AP: The access point. Also used to represent the identifier of the access point.

AP-Type: A value that identifies a participant in the protocol as being an access point.

APS: The access point server. Also used to represent the identifier of the AP server.

$Ksign_{wc,aps}$: The signing key shared between the WC and the AP server.

$Ksign_{ap,aps}$: The signing key shared between the AP and the AP server.

$Kcrypt_{wc,aps}$: The encryption key shared between the WC and the AP server.

$Kcrypt_{ap,aps}$: The encryption key shared between the AP and the AP server.

|: The concatenation operator; A|B is the result of concatenation of A and B.

HMAC-MD5($Ksign_{xx,aps}$, X): The HMAC-MD5 message digest of X using the signing key $Ksign_{xx,aps}$. Generally, X is a concatenation of items, such as ($N_a$|A|B). The subscript xx is either WC or AP.

RC-4($Kcrypt_{xx,aps}$, X): The RC-4 encryption of X using the encryption key.

$Kcrypt_{xx,aps}$. Generally X is a concatenation of items, such as ($N_a$|A|B). The subscript $_{xx}$ is either WC or AP.

$N_a$ or $N_b$: A random number (called in the Otway-Rees protocol a nonce). WCs and APs draw these numbers in such a way that the probability of using the same value twice during the lifetime of the shared key used to encrypt it is vanishingly small.

K: A session key shared between the WC and AP.

Exemplary Electronic System

With reference to FIG. 1, portions of the present invention are comprised of computer-readable and computer executable instructions which reside, for example, in computer-readable media of an electronic system such as a computer system. FIG. 1 illustrates an exemplary electronic device 150 upon which embodiments of the present invention may be practiced. It should be appreciated that electronic device 150 of FIG. 1 is an exemplary representation of a number of different computer systems and electronic devices in which the present invention can operate, including but not limited to desktop computers, laptop computers, PDAs (personal digital assistants), cell phones, pagers, etc.

Electronic system 150 includes an address/data bus 109 for communicating information, a processor 101 coupled with bus 109 for processing information and instructions, a non-volatile (ROM—read only memory) 102 coupled with bus 109 for storing static information and instructions for processor 101, and a volatile memory (RAM—random access memory) 103 coupled with bus 109 for storing information and instructions for the processor 101. Electronic device 150 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 150 include volatile memory 102, non-volatile memory 103, and data storage device 104.

Electronic device 150 of FIG. 1 can further include an optional signal generating device 108, e.g., a wireless network interface card (NIC) coupled with bus 109 for interfacing with other computer systems and/or other electronic devices. Electronic device 150 can also include an optional alphanumeric input device 106 which includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), another flat panel display, an electronic paper display, or other display device suitable for creating graphic images and alphanumeric characters recognizable to a user.

Electronic device 150 also includes an optional cursor control or directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 and know in the art including a trackball, mouse, optical mouse, touch pad, touch screen, joystick, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Exemplary Network Environment

Figure 2:
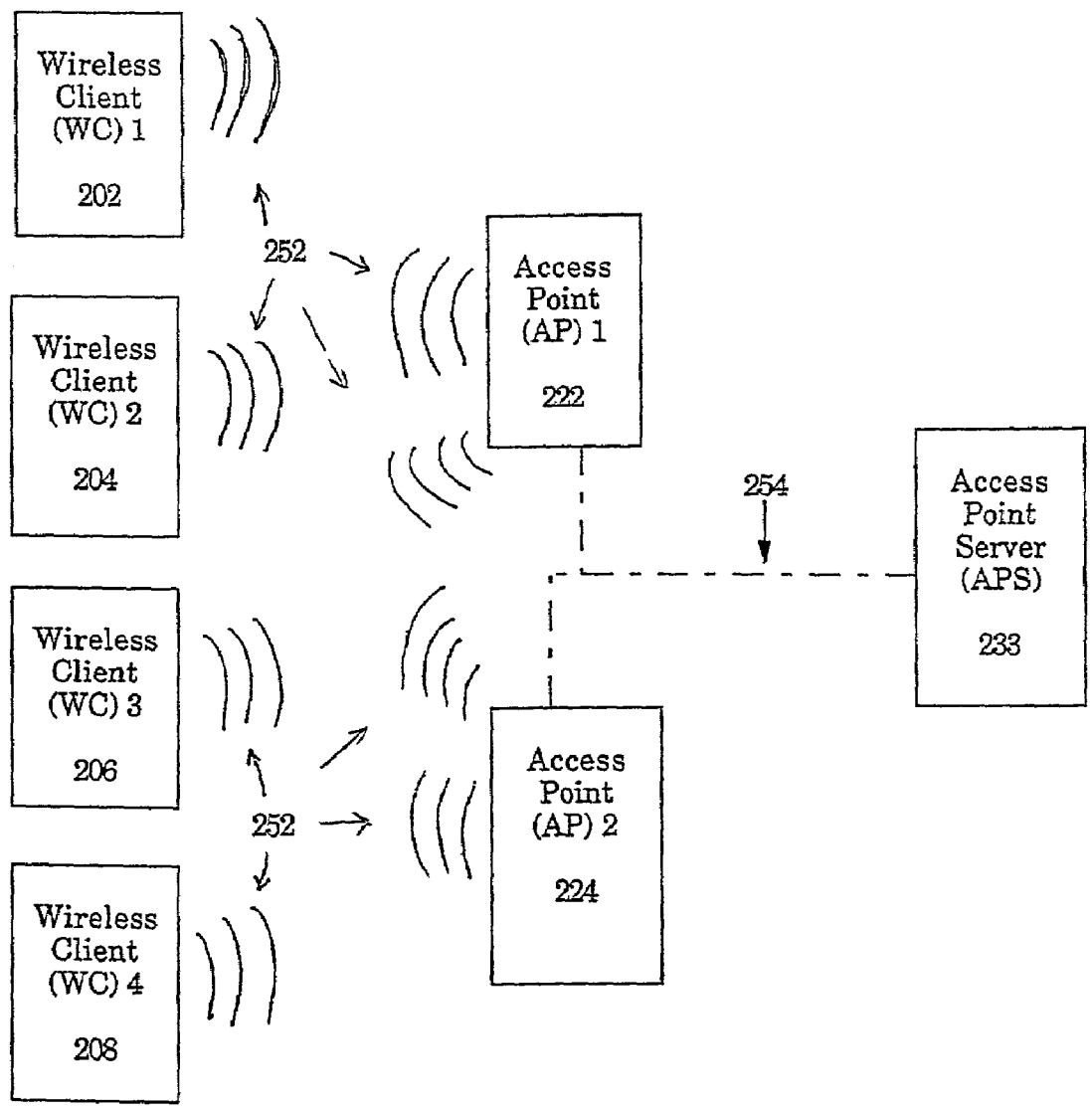
FIG. 2 illustrates an exemplary network environment including wireless and wired communication upon which embodiments of the present invention can be practiced.

Embodiments of the present invention, a method and system for providing a secure wireless network for communication between a wireless client and an access point, may be practiced in a wireless network environment. FIG. 2 illustrates an exemplary wireless network environment 200 in which embodiments of the present invention may be practiced. As illustrated, wireless network environment 200 includes an access point server (APS) 233 coupled with access point (AP1) 222 and also to access point (AP2) via connection 254. In one embodiment, connection 254 is a physical (e.g., wired) connection, such as that in an Ethernet, token ring, or fiber optic network configuration. In another embodiment, connection 254 is a wireless connection utilizing wireless communication techniques such as infrared transmission, spread spectrum radio transmission, narrowband radio transmission, or other technology that does not require a physical (wired) connection between access point server 233 and access point (AP1) 222 and access point (AP2) 224.

Still referring to FIG. 2, it should be appreciated that in another embodiment, there may be only a single access point (AP) coupled with access point server (APS) 233 via connection 254. It should be further appreciated that in yet another embodiment, more than the two access points (APs) shown in FIG. 2 may be coupled to access point server 233. Depending on the scope of the network environment in which embodiments of the present invention are implemented, in still another embodiment, there may be from tens to hundreds of access points coupled with access server 233. It should further be appreciated that if connection 254 between APS 233 and APs 222 and 224 is a wired physical connection, the connection is assumed to be secure. On the other hand, if connection 254 is a wireless connection between the APS 233 and the APs, 222 and 224 respectively, it is assumed that there is a previously distributed key in place between APS 233 and the APs.

Still referring to FIG. 2, wireless network environment 200 may include multiple wireless clients (WC) (202, 204, 206, 208, respectively) coupled with access point (AP1) 222 and access point (AP2) 224 via wireless connection 252. It should be appreciated that the wireless clients 202, 204, 206, 208 are each able to communicate with either of the access points, AP1 or AP2. Additionally, connection 252, a wireless connection, utilizes wireless communication techniques such as infrared transmission, spread spectrum radio transmission, narrowband radio transmission, or other technology that does not require a physical (e.g., wired) connection between access points (AP1) 222 and (AP2) 224 and the wireless clients, 202, 204, 206, 208. Wireless clients 202, 204, 206, 208, access points 222 and 224, and access point server 233 may be implemented with an electronic system, for example electronic system 150 of FIG. 1. In the present embodiment, the WCs, APs, and the APS are coupled to a number of network resources, e.g., file servers, printers, Internet gateways, etc., via connection 252 and 254.

In a preferred embodiment, Otway-Rees, implemented in conjunction with embodiments of the present invention, operates under the assumption that the WC shares a signing and encryption key with the APS and that the AP shares with the APS a different signing and encryption key. Signing keys are used within a cryptographically secure message authentication code algorithm (HMAC-MD5) while encryption keys are used with a symmetric encryption algorithm (RC4, DES). The security of the Otway-Rees scheme depends upon the security of the encryption algorithm (factoring in the key size).

In one embodiment, Otway-Rees is implemented through the utilization of an exchange of messages to mutually authenticate the WC and AP (presuming the APS is secure) and to mutually confirm possession of the session key by the WC and AP. The formulation is based upon analysis and corrections to the original Otway-Rees scheme by D. Otway and O. Rees, "Efficient and timely mutual authentication," Operating Systems Review, Vol. 21, No. 1, 1987, pp. 8–10, and as described in Menezes, A. J., et al., "Handbook of Applied Cryptography," CRC Press, New York, 1996, page 504, and also described in Mao, W., et al., "Development of authentication protocols: some misconceptions and a new approach," IEEE Computer Security Foundations Workshop VII, IEEE Computer Society Press, Los Alamitos, Calif., June 1994, pages 178–186.

In the present embodiment, the scheme uses two keys, one for signing and one for encrypting between the WC and APS as well as the AP and the APS. These keys must be distributed before the Otway-Rees protocol is run. One method of accomplishing the distribution of keys is for an administrator to execute a registration application to distribute a shared key between the AP and the APS. Another method of accomplishing the distribution of keys is each electronic system 150 that uses the wireless connection 252 or 254 would have to register using this application.

In either instance, the registration associates electronic systems with shared secrets, rather than associating users with shared secrets. It should be appreciated that in one embodiment of the present invention, associating electronic systems (e.g., WCs and APs) with shared secrets does not require the use of MAC (media access control) addresses to be implemented as a electronic system identifier, in comparison with other key distributions. Each of the electronic systems can be assigned an identifier from an arbitrary convenient name space. For example, multiple APs (access points) can be given identifiers such as AP1, AP2, etc., as shown in FIG. 2. Accordingly, WCs (wireless clients) can be given identifiers such as WC 1, WC 2, WC 3, and WC 4, also shown in FIG. 2.

Another method of accomplishing the distribution of keys while simultaneously reducing administrator overhead is to use a plug and play distribution scheme which is described in U.S. patent application Ser. No. 09/532,050, and entitled "Method for Secure Installation of Device in Packet Based Communication Network," by Nessett, Danny M., et al., assigned to the assignee of the present invention, and which is incorporated herein by reference.

According to one embodiment, and subsequent to the distribution of signing and encryption keys, as described above, FIG. 3 is a data flow diagram depicting the flow of data contained in messages exchanged during the distribution of cryptographic processes among a wireless client (WC 202 of FIG. 2) and an access point (AP 222 of FIG. 2) and an access point server (APS 233 of FIG. 2). WC 1 (wireless client 202) generates a message 301 which is transmitted to an AP 1 (access point 222) via a connection 252 (shown in FIG. 2). Message 301 contains a random number $N_a$, (for ensuring freshness of the communication as defined in the Otway-Rees scheme), drawn by WC 1 and WC 1 computes a first secure message digest HMAC-MD5($Ksign_{wc,aps}$, $N_a$|WC|AP), where WC and AP are identifiers representing respectively the wireless client and the access point. In one embodiment, the message digest is comprised of a message authentication code such as HMAC-MD5. Other message algorithms, e.g., HMAC-SHA-1 can be used. In the present embodiment, the secure message digest uses a signing key indexed by wireless client and access point identifiers. Once the computations have been performed by WC 1, (wireless client 202 of FIG. 220, the result, in this instance, message 301, is transmitted to AP 1 (access point 222 of FIG. 2).

Figure 3:
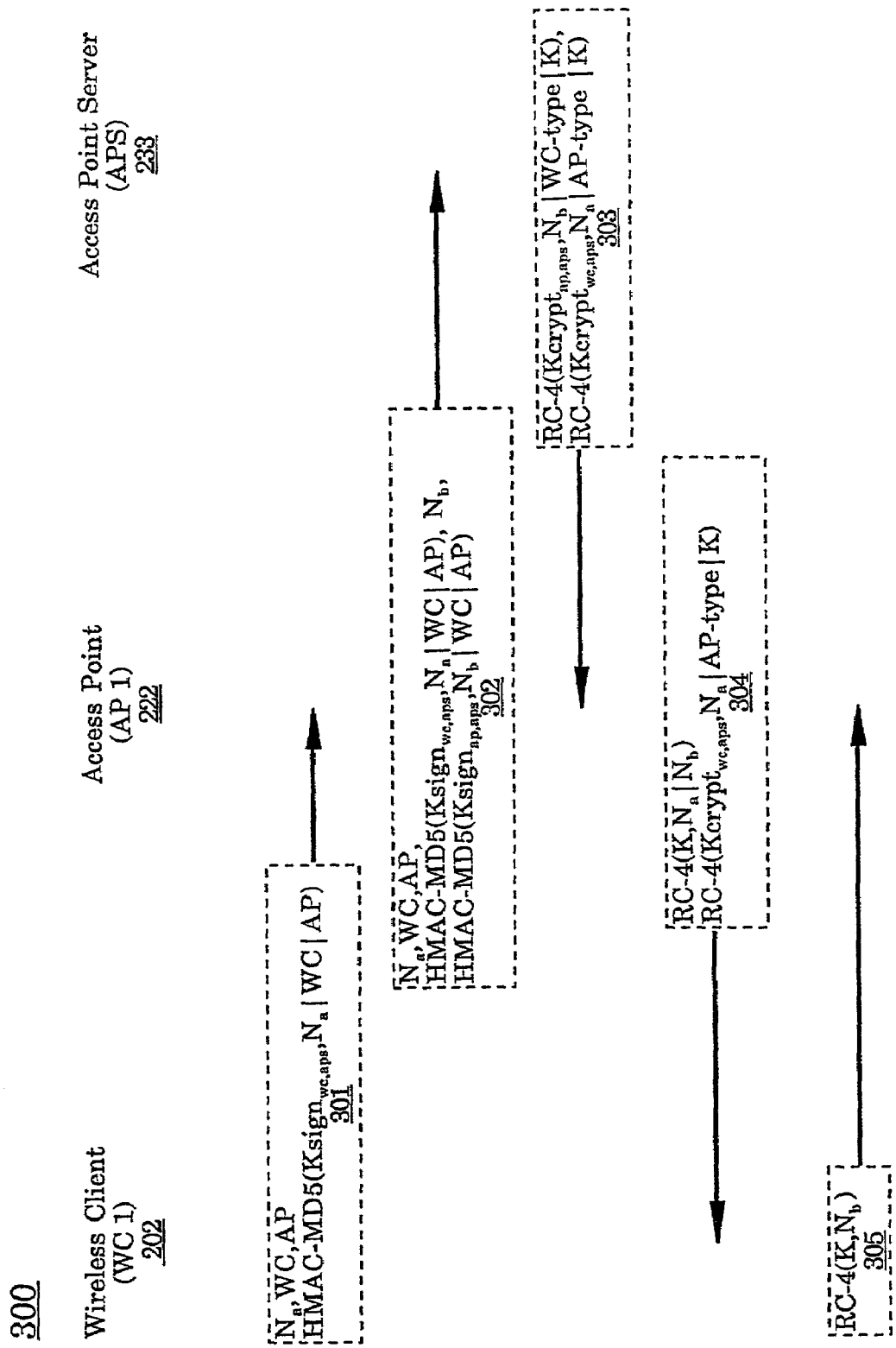
FIG. 3 is a data flow diagram depicting an exchange of messages, in accordance with one embodiment of the present invention.

Still referring to FIG. 3, subsequent to receiving of message 301 sent by WC 1, AP 1 generates a message 302 which is transmitted to APS 233 via connection 254. Message 302 contains a random number $N_b$, (also for ensuring freshness of the communication as defined in the Otway-Rees scheme), drawn by AP 1 and AP 1 computes a second secure message digest HMAC-MD5($Ksign_{ap,aps}$, $N_b$|WC|AP), where WC and AP are the identifiers representing the wireless client and the access point, respectively. The second secure message digest, in one embodiment, is comprised of a message authentication code such as HMAC-MD5. In the present embodiment, message 302 also uses a signing key indexed by access point and access point server identifiers. Once the calculations have been performed by AP 1 on the second message digest, this result, along with the contents of the first message are combined into message 302 and transmitted to APS 233.

It should be appreciated that the random numbers drawn by the wireless client and the access point, $N_a$ and $N_b$, respectively, are generated for each communication session and provide freshness of the communication. For example, if a message from a previous communication session was somehow intercepted and random number and session key contained therein were then used to attempt transmission of other messages to the wireless client or the access point, the random number and the session key of the previous communication will not match the random number and the session key of the current communication. Accordingly, any messages containing an old random number and session key are rejected by the receiving entity, e.g., wireless client 202 or access point 222 of FIG. 2. Therefore, the random numbers, drawn for each communication session, ensure freshness of the communication and also provide an additional measure of security regarding messages sent from unknown sources.

Subsequent to receiving of message 302 sent to APS 233 by AP 1 in FIG. 3, in one embodiment, APS 233 utilizes the identities WC (wireless client) and AP (access point) to look up the keys it shares with them and performs the following checks. APS 233 computes the first part of the message, HMAC-MD5($Ksign_{wc,aps}$, $N_a$|WC|AP) from WC 1, using the key shared between APS 233 and the wireless client, which in this example is WC 1. APS 233 compares the result against the value contained in the first message. APS 233 also computes the second part of the message, HMAC-MD5 ($Ksign_{ap,aps}$, $N_b$|WC|AP) from AP 1, using the key shared between APS 233 and the access point, AP 1 in this example. APS 233 compares the result against the value contained in the second message. If both of the comparisons are successful, such that the computed values are equal to the values in the received messages, then APS 233 computes a number, K, which is the correct length for the encryption algorithm. In one embodiment, this value may depend on $N_a$, $N_b$, as well as a random number generated by APS 233. In one embodiment, K represents the session key for the duration of the communication. APS 233 then performs a computation of the following two values. The first value uses the encryption key, $Kcrypt_{ap,aps}$ to encrypt the component RC-4($Kcrypt_{ap,aps}$, $N_b$|WC-type|K), shared between APS 233 and AP 1 and which identifies WC 1 as a participant. The second value uses the encryption key, $Kcrypt_{wc,aps}$, to encrypt the component RC-4($Kcrypt_{wc,aps}$, $N_a$|AP-type|K), shared between APS 233 and WC 1 and which identifies AP 1 as a participant. (In one embodiment, RC-4, an example of symmetric key cryptography algorithm, is used. Nearly any other symmetric key cryptography algorithm may be used, e.g., DES or 3DES.) Furthermore, these encrypted messages may also contain data that ensures their integrity, e.g., by appending to each computed value a supplemental message authentication code computed over their contents using $Ksign_{wc,aps}$ for the value encrypted by $Kcrypt_{wc,aps}$ and $Ksign_{ap,aps}$ for the value encrypted by $Kcrypt_{ap,aps}$. Continuing, both of these generated values, the components encrypted by the encryption key shared between the APS 233 and AP 1 and the encryption key shared between AP 1 and WC 1, and the session key, K, are then transmitted in message 303 to AP 1 via connection 254.

Subsequent to receiving message 303 from APS 233, and still referring to FIG. 3, AP 1 decrypts the first component, RC-4($Kcrypt_{ap,aps}$, $N_b$|WC-type|K), using the encryption key $Kcrypt_{ap,aps}$. AP 1 ensures that the first value of this component is the second random number (sent to APS 233 previously in message 302) and that the second value is identifying WC 1, affirming that AP 1 is communicating with WC 1. Additionally, if a supplemental third message authentication code is associated with the first component, AP 1 ensures that it is valid. If the values are correct, AP 1 extracts the session key, K, and using the value of K, the first random number, $N_a$, the second random number, $N_b$, and a symmetric key encryption algorithm, RC-4, computes RC-4 (K, $N_a$|$N_b$). AP 1 then sends a message 304 to WC 1. Message 304 contains, as a first component of this message, the second component of the received message 303, sent by APS 233, RC-4($Kcrypt_{wc,aps}$, $N_a$|AP-type|K) and also containing as a second component of this message, the result of the previous computation, RC-4(K,$N_a$|$N_b$). The second component of message 304 demonstrates that WC 1 is apprised of the session key, K.

Still referring to FIG. 3, subsequent to receiving message 304 sent by AP 1, WC 1 decrypts the first component of the message, RC-4($Kcrypt_{wc,aps}$,$N_a$|AP-type|K). WC 1 ensures that the first value of this portion of the message equals the first random number, $N_a$, it sent to AP 1 in message 301 and that the second value affirms that it is communicating with an AP, AP 1 in this example. In one embodiment, if a supplemental fourth message authentication code is associated with the first component, WC 1 ensures it is valid. If the values are correct, WC 1 then decrypts the second component of the received message, RC-4(K,$N_a$|$N_b$), and checks again that the first value is the first random number, $N_a$. If so, this affirms that the AP, AP 1 in this example, is apprised of the session key, K, and it therefore further affirms that when WC 1 encrypts/decrypts messages by the session key, K, only AP 1 could have read or have written those messages. WC 1 then encrypts the second value of the second component, the second random number, $N_b$, by the session key, K, and the result, RC-4(K,$N_b$) is transmitted to AP 1 in message 305.

Subsequent to receiving message 305 sent by WC 1, as described above and with reference to FIG. 3, AP 1 decrypts the value in the message, and compares this value with the value of the second random number, $N_b$. If the values are correct, this affirms that the WC, WC 1 in this example, is apprised of the session key, and is therefore confident that when it encrypts/decrypts messages by the session key, K, that only a WC, WC 1 in this instance, could read or have written those messages.

Therefore, once messages 301, 302, 303, 304, and 305 are exchanged between the wireless client, the access point, and the access point server, any communication via connection 252 and/or 254 is relatively free from intrusion and/or interception. Further, by distributing the cryptographic processes between the WC, the AP, and the APS, less computational burden is placed upon AP while a majority of cryptographic processes are placed upon the APS.

Figure 4:
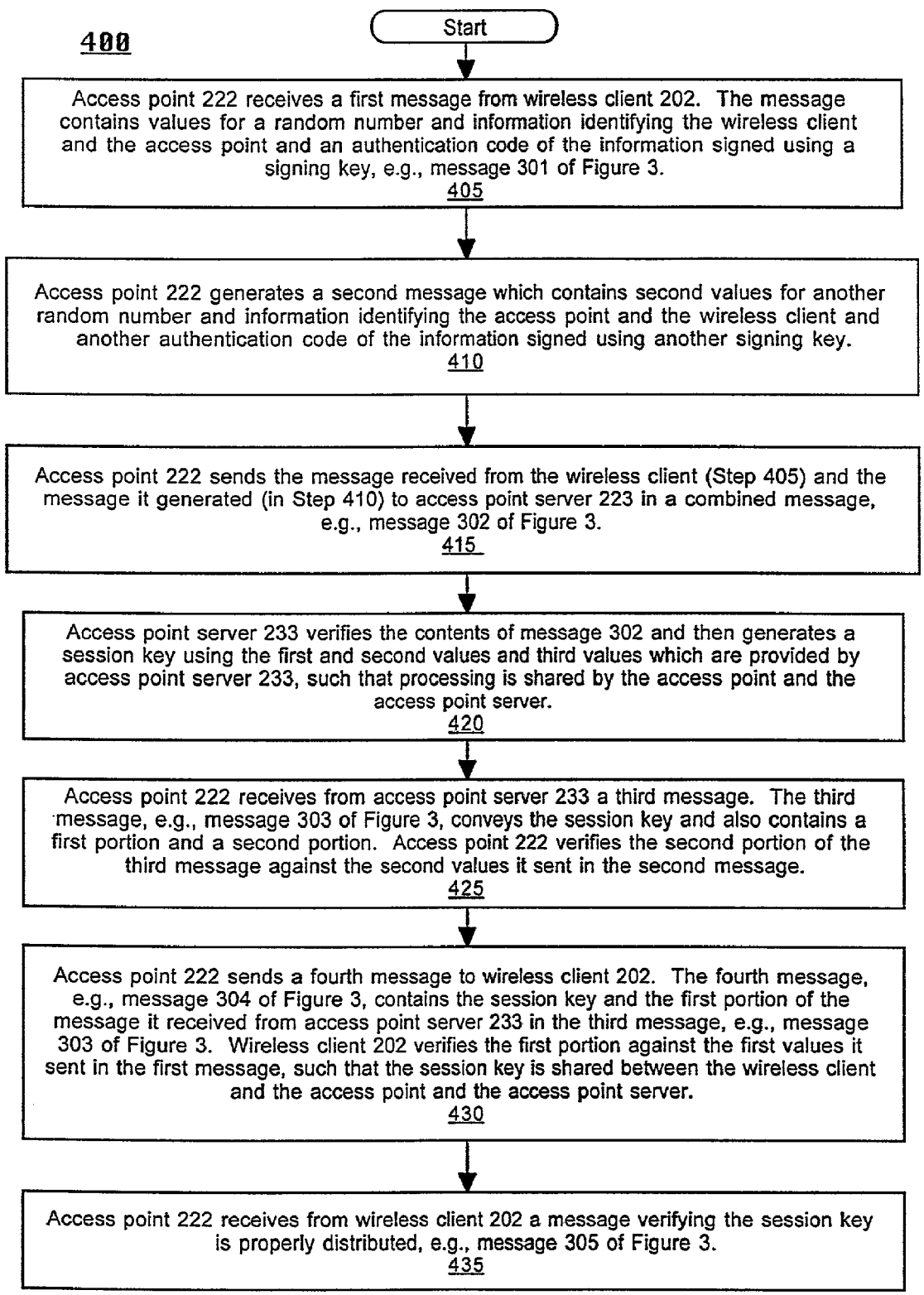
FIG. 4 is a flow chart illustrating steps in a process of distributing cryptographic processes, in accordance with one embodiment of the present invention.

FIG. 4 is a flow chart illustrating the steps of a process 400 for distributing cryptographic processes utilizing Otway-Rees Key Distribution, in one embodiment of the present invention.

In step 405, the access point, AP 1 of FIG. 2, receives a message from a wireless client, WC 1 of FIG. 2. In one embodiment, the message contains first values for a first random number and information identifying the wireless client (WC 1) and the access point (AP 1). Also included in the message is a first message authentication code of the information signed using a first signing key. It should be appreciated that this step requires the WC to postulate in advance to which access point, AP 1 or AP 2 of FIG. 2, it is talking. In this example, the wireless client, WC 1, is communicating with access point AP 1. This can be determined by a preliminary message exchange, whereby the AP proposes its identity. Wireless client 202 need not rely on this proposal, as in a preferred embodiment, the Otway-Rees protocol is designed to authenticate the access point and the wireless client, in this example AP 1 and WC 1, respectively. The access point (AP 1) receives the first message, e.g., message 301 as described in FIG. 3, from the wireless client (WP 1) via connection 252 (FIG. 2).

In step 410 of FIG. 4, the access point (AP 1) generates a second message. The second message contains second values for a second random number and information identifying the access point and the wireless client. The second message also includes a message authentication code of the information signed using a second signing key, as described in message 302 of FIG. 3. It is appreciated that the access point, AP 1, is apprised of the claimed identity of wireless client 202, since the WC identity is delivered to the AP in the message sent (message 301 of FIG. 3), as described in step 405.

In step 415 of FIG. 4, the access point, AP 1, then transmits the first message it received from WC 1, message 301 and the message it generated, as described in step 410, in a combined message, e.g., message 302 of FIG. 3, to the access point server (AP 233) via connection 254 of FIG. 2.

In step 420 of FIG. 4, the access point server (AP 233) first verifies the contents of mesage 302 of FIG. 3 and then generates a session key, K, using the first values as described in step 405 and the second values as described in step 410, both of which were included in message 302, and third values which are provided by the access point server (AP 233), such that the processes are shared between the access point and access point server, AP 1 and APS 233, respectively, in this embodiment.

In step 425, the access point, AP 1, receives from the access point server, AP 233, a third message via connection 254 of FIG. 2. The third message, e.g., message 303 of FIG. 3, conveys the session key, K, as generated by APS 233 and a first portion and a second portion. AP 1 then verifies the second portion of the third message against the second values it sent (step 410 of FIG. 4) in message 302 of FIG. 3.

In step 430 of FIG. 4, the access point (AP 1) sends to the wireless client (WC 1) a fourth message. The fourth message contains the session key, K. as generated by the access point server (APS 233) and the first portion of the third message, message 303 of FIG. 3. The wireless client (WC 1) verifies the first portion against the first values which it sent in message 301 of FIG. 3 (step 405 of FIG. 4), such that the session key is distributed between the wireless client and the access point and the access point server.

In step 435, the access point (AP 1) receives a message, e.g., message 305 of FIG. 3, from the wireless client (WP 1) which verifies that the session key has been properly distributed among the wireless client and the access point and the access point server, thus ensuring that the encrypted communication is relatively free from intrusion and/or interception. Further, by utilizing an access point server, some if not a majority of encrypting processes are offloaded from the access point, thereby decreasing the computational load placed upon the access point.

It should be appreciated that in another embodiment, the encrypted messages, as described in message 303 of FIG. 3, may also contain data that ensures their integrity, for example, by appending to them a supplemental message authentication code computed over their contents using $Ksign_{wc,aps}$ for the value encrypted by $Kcrypt_{wc,aps}$ and $Ksign_{ap,aps}$ for the value encrypted by $Kcrypt_{ap,aps}$.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a network access point, a method of processing encrypted communication, according to an encryption/decryption process, said method comprising:
   receiving a first message from a wireless client, said first message comprising first values for a first random number and information identifying said wireless client and said access point and a first message authentication code of said information in said first message signed using a first signing key;
   generating a second message comprising second values for a second random number and information identifying said access point and said wireless client and a second message authentication code of said information in said second message signed using a second signing key; and
   sending a combined said first values and said second values to an access point server, wherein said access point server generates a session key using said first values and said second values and also third values provided by said access point server, such that processing is shared by said access point and said access point server.

2. The method as recited in claim 1 further comprising:
   receiving a third message conveying said session key from said access point server, said third message having a first portion and a second portion; and
   verifying said second portion of said third message against said second values.

3. The method as recited in claim 2 further comprising:
   sending said first portion of said third message to said wireless client, wherein said wireless client verifies said first portion of said third message against said first value, such that said session key is shared between said wireless client and said access point and said access point server.

4. The method as recited in claim 2 wherein said first portion of said third message further comprises data for ensuring validity of said first portion and wherein said second portion of said third message further comprises data for ensuring validity of said second portion.

5. The method as recited in claim 1 wherein said third value is correct for said encryption/decryption process.

6. The method as recited in claim 1 wherein said network is a wireless network.

7. The method as recited in claim 1 wherein said encrypting/decrypting process comprises a distributed symmetric key distribution process.

8. The method as recited in claim 7 wherein said distributed symmetric key distribution process is Otway-Rees key cryptography.

9. A computer system in a computer system network, said computer system comprising:
- a bus;
- a memory unit coupled to said bus;
- a processor coupled to said bus for executing a method of processing encrypted communication comprising:
- receiving a first message from a wireless client, said first message comprising first values for a random number and information identifying said wireless client and an access point and a message authentication code of said information in said first message signed using a first signing key;
- generating a second message comprising second values for a second random number and information identifying said access point and said wireless client and a message authentication code of said information in said second message signed using a second signing key; and
- sending a combined said first values and said second values to an access point server, wherein said access point server generates a session key using said first values and said second values and also third values provided by said access point server, such that said processing is shared by said access point and said access point server.

10. The computer system of claim 9 wherein said method further comprises:
- receiving a third message conveying said session key from said access point server, said third message having a first portion and a second portion; and
- verifying said second portion of third message against said second values.

11. The computer system of claim 10 wherein said method further comprises:
- sending said first portion of said third message to said wireless client, wherein said wireless client verifies said first portion of said third message key against said first value, such that said session key is shared between said wireless client and said access point and said access point server.

12. The computer system of claim 10 wherein said first portion of said third message further comprises data for ensuring validity of said first portion and wherein said second portion of said third message further comprises data for ensuring validity of said second portion.

13. The computer system of claim 9 wherein said third values are correct for said encryption/decryption process.

14. The computer system of claim 9 wherein said network is a wireless network.

15. The computer system of claim 9 wherein said encrypting/decrypting process comprises a distributed symmetric key distribution process.

16. The computer system of claim 15 wherein said distributed symmetric key distribution process is Otway-Rees key cryptography.

17. A computer-usable medium having computer-readable program code embodied therein for causing a computer system to perform:
- receiving a first message from a wireless client, said first message comprising first values for a random number and information identifying said wireless client and an access point and a message authentication code of said information in said first message signed using a first signing key;
- generating a second message comprising second values for a second random number and information identifying said wireless client and said access point and a message authentication code of said information in said second message signed using a second signing key; and
- sending a combined said first values and said second values to an access point server, wherein said access point server generates a session key using said first values and said second values and also third values provided by said access point server, such that processing of encrypted communication is shared by said access point and said access point server.

18. The computer-usable medium of claim 17 wherein said computer-readable program code embodied therein causes a computer system to perform:
- receiving a said third message conveying said session key from said access point server, said third message having a first portion and a second portion; and
- verifying said second portion of said third message against said second values.

19. The computer-usable medium of claim 18 wherein said computer-readable program code embodied therein causes a computer system to perform:
- sending said first portion of said third message to said wireless client, wherein said wireless client verifies said first portion of said third message against said first values, such that said session key is shared between said wireless client and said access point and said access point server.

20. The computer-usable medium of claim 18 wherein said first portion of said third message further comprises data for ensuring validity of said first portion and wherein said second portion of said third message further comprises data for ensuring validity of said second portion.

21. The computer-usable medium of claim 17 wherein said computer system is an access point in a network.

22. The computer-usable medium of claim 21 wherein said third values are correct according to an encryption/decryption process implemented in said network.

23. The computer-usable medium of claim 18 wherein said network is a wireless network.

24. The computer-usable medium of claim 22 wherein said encryption/decryption process comprises a distributed symmetric key distribution process.

25. The computer-usable medium of claim 24 wherein said distributed symmetric key distribution process is Otway-Rees key cryptography.

* * * * *